US012231850B2

(12) United States Patent
Wilson et al.

(10) Patent No.: US 12,231,850 B2
(45) Date of Patent: Feb. 18, 2025

(54) METHOD FOR DIRECTIONAL SIGNAL PROCESSING FOR A BINAURAL HEARING SYSTEM

(71) Applicant: Sivantos Pte. Ltd., Singapore (SG)

(72) Inventors: Cecil Wilson, Erlangen (DE); Christoph Lüken, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 18/610,524

(22) Filed: Mar. 20, 2024

(65) Prior Publication Data

US 2024/0323617 A1 Sep. 26, 2024

(30) Foreign Application Priority Data

Mar. 20, 2023 (DE) ..................... 10 2023 202 422.5

(51) Int. Cl.
*H04R 25/00* (2006.01)

(52) U.S. Cl.
CPC ......... *H04R 25/505* (2013.01); *H04R 25/552* (2013.01); *H04R 25/554* (2013.01)

(58) Field of Classification Search
CPC .. H04R 25/405; H04R 25/407; H04R 25/505; H04R 25/552; H04R 25/554
USPC .......................................................... 381/312
See application file for complete search history.

(56) References Cited

U.S. PATENT DOCUMENTS 9,253,581 B2 2/2016 Aubreville et al.
10,715,933 B1 7/2020 Ma et al.
10,887,704 B2 1/2021 As'Ad et al.
11,089,410 B2 8/2021 Fischer et al.
(Continued)

FOREIGN PATENT DOCUMENTS

DE 202019107200 U1 5/2020
DE 102019211943 A1 2/2021
DE 102020210805 B3 2/2022
(Continued)

OTHER PUBLICATIONS

As'ad, Acoustic Beamformers and their Applications in Hearing Aids, Ottawa-Carleton Institute for Electrical and Computer Engineering, School of Electrical Engineering and Computer Science, 2020, Ottawa Canada.

*Primary Examiner* — Phylesha Dabney
(74) *Attorney, Agent, or Firm* — Laurence A. Greenberg; Werner H. Stemer; Ralph E. Locher

(57) ABSTRACT

A method for directional signal processing for a binaural hearing system. In input transducers of first and second hearing instruments generate input signals from an ambient sound signal. A direction relative to a preferred direction and a distance from a reference point of the binaural hearing system are predetermined, to predetermine a focal point. First and second directional signals are generated from input signals by directional signal processing so that a direction of maximum sensitivity, starting from the first and second hearing instruments form respective a first and second yaw angles with the preferred direction. The yaw angles are adjusted via the directional signal processing of the input signals so that a superposition of the first and second directional signals has a maximum sensitivity in an overlap region that includes the predetermined focal point. An output signal of the binaural hearing system is generated based on the superposition.

13 Claims, 4 Drawing Sheets

(56) References Cited

U.S. PATENT DOCUMENTS

| | | | | |
|---|---|---|---|---|
| 11,743,637 | B2 | 8/2023 | Fischer et al. | |
| 2020/0204927 | A1* | 6/2020 | As'Ad | H04R 25/552 |

FOREIGN PATENT DOCUMENTS

| | | | |
|---|---|---|---|
| EP | 3490273 | A1 | 5/2019 |
| WO | 2020245232 | A1 | 12/2020 |

* cited by examiner

METHOD FOR DIRECTIONAL SIGNAL PROCESSING FOR A BINAURAL HEARING SYSTEM

CROSS-REFERENCE TO RELATED APPLICATION

This application claims the priority, under 35 U.S.C. § 119, of German Patent Application DE 10 2023 202 422.5, filed Mar. 20, 2023; the prior application is herewith incorporated by reference in its entirety.

FIELD AND BACKGROUND OF THE INVENTION

The invention relates to a method for directional signal processing for a binaural hearing system having a first hearing instrument and a second hearing instrument. A first directional signal is generated on the basis of first input signals of the first hearing instrument by means of directional signal processing, and a second directional signal is generated on the basis of second input signals by means of directional signal processing, and wherein an output signal of the hearing system is generated by means of a superposition of the first directional signal of the first hearing instrument with the second directional signal of the second hearing instrument.

A hearing instrument generally refers to an electronic device that supports the hearing capacity of a person wearing the hearing instrument (hereafter referred to as the "wearer" or "user"). In particular, the invention relates to hearing instruments which are designed to completely or partially compensate for a hearing loss of a hearing-impaired user. Such an instrument is also known as a hearing aid. In addition, there are hearing instruments that protect or improve the hearing capacity of normal-hearing users, for example to enable improved speech comprehension in complex listening situations, or in the form of communication devices (e.g., headsets or similar, possibly with earbud-shaped headphones).

Hearing instruments in general, and hearing aids in particular, are usually designed to be worn on the head and here in particular, in or on an ear of the user. In the operation of the hearing instrument, one or more (acousto-electric) input transducers capture an ambient sound and convert this ambient sound into a corresponding electrical input signal, the voltage fluctuations of which typically carry information on the vibrations of the air pressure induced in the air by the ambient sound. In a signal processing device (a signal processor), the or each input signal is processed (i.e., modified with regard to its sound information) in order in particular to support the hearing capacity of the user, particularly preferably to compensate for a hearing loss of the user. The signal processing device outputs a correspondingly processed audio signal as an output signal to an output transducer (e.g., a loudspeaker), which converts the output signal into an output sound signal. The output sound signal can consist of airborne sound, which is emitted into the user's auditory canal. For example, the output sound signal can also be emitted into the bones of the user's skull.

In particular, individual sound sources can be emphasized by directional signal processing (directional microphony) of multiple input signals, or noise sources can be decreased or even completely masked. Especially in more complex listening situations with multiple sound sources, only one or a few of which may be considered useful signal sources, the wearer can benefit from a possible improvement in the signal-to-noise ratio (SNR). However, a problem can arise when a noise source is located in the same spatial direction as a useful signal source.

SUMMARY OF THE INVENTION

It is accordingly an object of the invention to provide a signal processing method which overcomes the above-mentioned and other disadvantages of the heretofore-known devices and methods of this general type and which provides for a method for directional signal processing for a hearing instrument or a hearing system having a hearing instrument, which allows a targeted emphasis of a useful signal source in the simultaneous presence of noise sources in the same spatial direction.

With the above and other objects in view there is provided, in accordance with the invention, a method for directional signal processing in a binaural hearing system having a first hearing instrument and a second hearing instrument, the method comprising:

- generating by a plurality of input transducers of the first hearing instrument a plurality of first input signals from a sound signal of the environment;
- generating by a plurality of second input transducers of the second hearing instrument a plurality of second input signals from the sound signal of the environment;
- determining a direction with respect to a preferred direction of the binaural hearing system and a distance from a reference point of the binaural hearing system, and thereby determining a focal point;
- generating a first directional signal from the first input signals by directional signal processing, such that a direction of maximum sensitivity, starting from the first hearing instrument, forms a first yaw angle with the preferred direction;
- generating a second directional signal from the second input signals by directional signal processing, such that a direction of maximum sensitivity, starting from the second hearing instrument, forms a second yaw angle with the preferred direction;
- adjusting the first yaw angle and the second yaw angle via the directional signal processing of the first and second input signals such that a superposition of the first directional signal with the second directional signal has a maximum sensitivity in an overlap region that includes the predetermined focal point; and
- generating an output signal of the binaural hearing system on a basis of the superposition of the first and second directional signals.

In other words, the above and other objects are achieved, in accordance with the invention, by a method for directional signal processing for a binaural hearing system having a first hearing instrument and a second hearing instrument, wherein a plurality of input transducers of the first hearing instrument generates a corresponding plurality of first input signals from a sound signal of the environment, wherein a plurality of second input transducers of the second hearing instrument generates a corresponding plurality of second input signals from the sound signal of the environment, and wherein a direction with respect to a preferred direction of the binaural hearing system and a distance with respect to a reference point of the binaural hearing system are predetermined, and a focal point is thereby predetermined.

According to the method, it is provided that a first directional signal is generated from the first input signals by means of directional signal processing in such a way that a direction of maximum sensitivity, starting from the first hearing instrument, forms a first yaw angle with the said preferred direction, and a second directional signal is generated from the second input signals by means of directional signal processing, in such a way that a direction of maximum sensitivity, starting from the second hearing instrument, forms a second yaw angle with the said preferred direction, wherein the first yaw angle and the second yaw angle are adjusted via the directional signal processing of the first and second input signals respectively, in such a way that a superposition of the first directional signal with the second directional signal has a maximum sensitivity in an overlap region that includes the predetermined focal point, and wherein an output signal of the binaural hearing system is generated on the basis of the said superposition. Advantageous embodiments, which are inventive in themselves, are the subject matter of the dependent claims and the following description.

A hearing instrument, in this case, generally refers to any device which is designed to generate a sound signal from an electrical signal—which can also be provided by an internal signal of the device—and to deliver said sound signal to the hearing system of a wearer of this device, in particular to a headphone (e.g., as an "earplug"), a headset, a pair of data glasses with a loudspeaker, etc. A hearing instrument, however, also includes a hearing device in the narrower sense, that is, a device for treating a hearing impairment of the wearer, in which an input signal generated from an ambient signal by means of a microphone is processed into an output signal and amplified, in particular in a frequency band-dependent manner, and an output sound signal generated from the output signal by means of a loudspeaker or similar device is suitable for compensating for the hearing impairment of the wearer, at least partially, in particular in a user-specific manner.

The term "binaural hearing system" refers to a system comprising two hearing instruments in the above sense, each individual one of which serves to treat one ear of the wearer (i.e., the left or the right ear) and is worn by the wearer on or in the respective ear when operated as intended, so that both ears of the wearer are treated by one hearing instrument each.

An input transducer in this case includes any device which is configured to generate a corresponding electrical signal from an acoustic signal. In particular, the generation of the first or second input signal by the respective input transducer can also include a pre-processing stage, e.g., in the form of a linear pre-amplification and/or an A/D conversion. The input signal generated accordingly is formed in particular by an electrical signal, the current and/or voltage fluctuations of which essentially represent the sound pressure fluctuations of the air.

In each of the two hearing instruments, therefore, from the ambient sound, which preferably comprises at least one useful signal of a corresponding useful signal source, a plurality of first and second input signals is generated by corresponding first and second input transducers, wherein the specific number does not necessarily have to be identical for both hearing instruments. However, the same number of input signals is preferably generated in both hearing instruments.

A distance is now defined with respect to a reference point of the binaural hearing system, as well as a direction with respect to a preferred direction of the binaural hearing system. This defines a focal point, which is thus located in the specified direction at the specified distance with respect to the preferred direction and starting from the reference point. Preferably, this specifies the direction and distance for a sound source, particularly preferably for a useful signal source.

In particular, the said reference point of the binaural hearing system is determined on the basis of a mid-point between the first hearing instrument and the second hearing instrument when the system is worn as intended, and/or the said preferred direction of the binaural hearing system is determined on the basis of a frontal direction of the wearer when wearing the hearing instruments of the hearing system as intended. The term 'wearing as intended' includes in particular the arrangement of the hearing instruments in or on the respective ear as intended for operation, matching their anatomy. The reference point and/or the preferred direction can be determined directly as the mid-point or the frontal direction, or as a function of these, for example via a relative (angular) deviation that should not be exceeded.

The concept of directional signal processing comprises in particular a mapping of the signals to be processed by the directional signal processing onto at least one signal resulting from the directional signal processing, which has a non-trivial directional characteristic, i.e., has different sensitivities in at least two different spatial directions as a result of the directional signal processing. In particular, the directional signal processing can be achieved by means of a possibly multi-stage (i.e., cascaded), time-delayed superposition of the signals to be processed, wherein optionally, by means of a primary time-delayed superposition one or more intermediate signals are first generated, which in turn (optionally time-delayed again) can be superimposed in order to generate the resulting signal.

The first input signals are then processed by means of such directional signal processing into the first directional signal as a resulting signal, in such a way that the direction of maximum sensitivity (in particular the maximum of the directional characteristic) of the first directional signal is pivoted relative to the predetermined preferred direction of the binaural hearing system by a first yaw angle. This can be implemented in particular via the parameters of the directional processing (e.g., time constants and/or weights of the superposition). The same applies to the generation of the second directional signal from the second input signals with respect to the second yaw angle.

Via parameters of the respective directional signal processing, the first and the second yaw angle of the first and second directional signal should be adjusted in such a way that the two directional signals, idealized as beam-shaped and represented by their yaw angles (or corresponding rays emanating from the respective hearing instrument, which are at the corresponding yaw angle to the preferred direction), crossing as closely as possible at the focal point or at least in a delimitable region in its immediate vicinity (such a region can be defined, for example, by limits for relative angular deviations of the yaw angle and/or for relative deviations of the maximum sensitivity).

A superposition of the first directional signal thus generated with the correspondingly generated second directional signal now has an overlap region in which the two maximum sensitivities of the directional signals are amplified (for example in comparison to a sensitivity of this superposition averaged over the entire space). Depending on the specification of the preferred direction and the distance (above all in comparison to the distance between the hearing instruments), this overlap region can cover not only a specific spatial direction (the preferred direction), but can also cover a minimum and/or maximum radial extent with respect to the reference point in this spatial direction (or an angular region that can be delimited as described above), depending on its specific design. This means in particular that the maximum sensitivity of the signal resulting from the said superposition is located in the relevant spatial direction at a specific distance, and with increasing (and in particular also decreasing) distance in the spatial direction (at a constant angular width, or spread) the sensitivity decreases, wherein the spatial direction and the distance are preferably selected in such a way that they correspond to the focal point.

In this way, the superposition can generate a signal, which can emphasize sound sources in a specifically predetermined and in particular not only angular, but also radially delimitable spatial region, and in doing so de-emphasize sound sources located in the same spatial direction, but further away (i.e., outside the radial boundary).

The signal resulting from the said superposition of the first directional signal with the second directional signal is then used for the generation of an output signal, which is preferably output by an output transducer of the hearing system to the hearing system of the wearer. An output transducer can include any device which is designed and configured to convert an electrical signal into a corresponding sound signal, wherein voltage and/or current fluctuations in the electrical signal are converted into corresponding amplitude fluctuations of the sound signal, thus in particular a loudspeaker, a so-called balanced metal case receiver, but also a bone-conducting headset.

In particular, for the above-described method the respectively required input and/or directional signals as well as information on the predetermined direction and the predetermined distance between the two hearing instruments can be transmitted. The preferred method involves transmitting only the contra-lateral directional signal from the respective other hearing instrument at the level of the signals (e.g., the second directional signal from the second hearing instrument to the first hearing instrument).

Preferably, the first yaw angle and the second yaw angle are adjusted on the basis of the predetermined distance and the predetermined direction and on the basis of the distance of the first hearing instrument from the second hearing instrument, in particular via parameters of the respective directional signal processing, in such a way that an intersection point of the associated angular lines (or rays) of the two yaw angles emanating from the respective hearing instrument does not exceed a predetermined maximum distance from the predetermined focal point. The yaw angles can be adjusted in particular such that the intersection point ideally exactly coincides with the focal point. However, it may be advantageous, e.g., if a sound source to be emphasized is moving, if the intersection point of the directional signals, idealized as beam-shaped, is not placed exactly at the focal point at all times, but rather allows a predefined, maximum deviation.

It proves advantageous if the first directional signal is generated from the first input signals in such a way that it has a first angular width (i.e., angular aperture, angular spread) around the first yaw angle, within which the sensitivity does not fall below a predetermined minimum value, and/or if the second directional signal is generated from the second input signals in such a way that it has a second angular width about the second yaw angle, within which the sensitivity does not fall below a specified minimum value. This ensures that the overlap region does not fall below a specific radial and angular dimension. This is particularly advantageous for a safe "catching" of the focal point with the overlap region.

Conveniently, the first angular width and/or the second angular width is defined on the basis of the smallest distance of the overlap region from the reference point and/or on the basis of the largest distance of a spatial point of the overlap region from the reference point. This means in particular that a radial extent is specified for the overlap region, which is bounded by the smallest distance of the overlap region to the reference point, the largest distance of a spatial point of the overlap region to the reference point, and the first or second angular width, preferably via parameters of the respective directional signal processing, are adjusted on the basis of this radial extent.

Preferably, the first directional signal is generated on the basis of a time-delayed superposition of the first input signals, and in the process the first yaw angle and optionally the first angular width is adjusted using at least one time constant and/or at least one weighting factor of said time-delayed superposition. Accordingly, the second directional signal is generated on the basis of a time-delayed superposition of the second input signals, and in the process the second yaw angle or the second angular width is adjusted using at least one time constant and/or at least one weighting factor of said time-delayed superposition. As linear signal processing processes, time-delayed superpositions have the advantage of simple implementation and easily understandable control of the respective angular sizes.

It also proves advantageous in this case if as the plurality of first input signals a front first input signal and a rear first input signal are each generated by a corresponding frontal and rear first input transducer, and/or, as the plurality of second input signals, a front second input signal and a rear second input signal are each generated by a corresponding frontal and rear second input transducer. While more than two input signals per hearing instrument can also be used for the method, on the one hand, the use of only two input signals per hearing instrument is already sufficient, and moreover, sufficient for an output signal of usable quality for the emphasis of a sound signal at the focal point. In addition, hearing instruments to be worn on or in the ear are often subject to considerable restrictions in the space available for individual components. When the hearing instrument in question is worn as intended, the respective frontal or rear input transducer is preferably arranged correspondingly further forward or further back in the hearing instrument with regard to the preferred direction (wherein, in addition, a longitudinal displacement, i.e., cranial or caudal, for both input transducers of the same hearing instrument is possible).

In an advantageous embodiment, a head-related transfer function (HRTF) for the first hearing instrument or for the second hearing instrument is used for adjusting the first yaw angle and/or the second yaw angle. An HRTF describes the spatial filtering effect of the shadowing effects of the head and outer ear (pinna and concha) as a function of angle for sound propagating to the auditory canal. Such shadowing effects can influence the direction of maximum sensitivity for the first or second directional signal, and thus distort it with respect to the yaw angle to be adjusted. Taking these effects into account by means of HRTFs thus allows any such distortion to be corrected.

It also proves advantageous if the direction with respect to the preferred direction of the binaural hearing system is specified as a direction of a sound source in the environment with respect to the preferred direction, and if the distance with respect to the reference point of the binaural hearing system is specified as a distance of said sound source to the reference point. Although the method can in principle emphasize the overlap region regardless of whether a useful signal source is arranged at the focal point (or nearby), in the case of a sound source for the specification of the direction and distance, it is particularly advantageous due to the possibility of a selective emphasis of the sound source. The specification can be provided in particular statically, or also dependent on external information (e.g., using data glasses or the like).

However, it is particularly advantageous for the specification if, based on an analysis of at least some of the first input signals and/or the second input signals, the direction of the sound source in the environment with respect to the said preferred direction and/or the distance of the sound source with respect to said reference point is determined to obtain the specification. This allows the emphasis of the sound source to be performed dynamically as a function of its position, and in particular a change in a position of a specific sound source can be taken into account for updating the focal point.

For this purpose, a change in the direction and/or the distance of the sound source is preferably determined based on said analysis of at least some of the first input signals and/or the second input signals, wherein the specification of the focal point is updated accordingly and wherein the first yaw angle and the second yaw angle are re-adjusted accordingly.

In a further advantageous embodiment, a plurality of first analysis directional signals is generated based on the first input signals by means of directional signal processing, in such a way that each of the first analysis directional signals has a minimum sensitivity in a different minimum direction with respect to the preferred direction in each case, and a first source direction of the sound source with respect to the said preferred direction is determined on the basis of the first analysis directional signals, starting from the first hearing instrument, wherein a plurality of second analysis directional signals is generated based on the second input signals by means of directional signal processing, in such a way that each of the second analysis directional signals has a minimum sensitivity in a different minimum direction with respect to the preferred direction in each case, and a second source direction of the sound source with respect to the said preferred direction is determined on the basis of the second analysis directional signals, starting from the second hearing instrument. Furthermore, on the basis of the first source direction, the second source direction and the distance between the first hearing instrument and the second hearing instrument, the distance of the said sound source with respect to the reference point of the binaural hearing system and the direction of the sound source with respect to the preferred direction are determined. The analysis thus described by means of the said analysis directional signals is preferably carried out in each case in an analysis path of the hearing system, in particular of the respective hearing instrument, and generation of an output signal of the hearing system is preferably carried out in a processing path parallel to the analysis path. The analysis directional signals thus "scan" the environment in each case, in order to determine for each hearing instrument, in each case with respect to the preferred direction, the source direction of a particular sound source, preferably a specific speaker.

For this purpose, speech recognition is preferably carried out in each of the first and/or second directional signals based on spectral and/or temporal features, wherein the first or second source direction is determined based on speech components detected in the first and/or second directional signals, and a first speaker is localized as the sound source.

In particular, a specific first input signal of a specific first or second input transducer can be used as the first or second reference signal, wherein speech recognition is carried out in the first or second reference signal, and wherein the first or second source direction is determined on the basis of differences of speech components, in this case detected in the first or second reference signal, with respect to the speech components detected in the first or second reference signals respectively.

The invention further specifies a binaural hearing system having a first hearing instrument and a second hearing instrument, wherein the binaural hearing system is configured to carry out the above-described method. The binaural hearing system according to the invention shares the advantages of the method according to the invention. The advantages specified for the method and for its extensions can be transferred mutatis mutandis to the binaural hearing system. For carrying out the method, the binaural hearing system is equipped in particular with the corresponding input transducers and additionally with means for directional signal processing and means for transmitting respectively required input and/or directional signals as well as angle and/or distance information between the two hearing instruments.

Other features which are considered as characteristic for the invention are set forth in the appended claims.

Although the invention is illustrated and described herein as being embodied in a method for directional signal processing for a binaural hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Equivalent parts and dimensions are provided with identical reference signs and symbols throughout the figures.

DETAILED DESCRIPTION OF THE INVENTION

Figure 1:
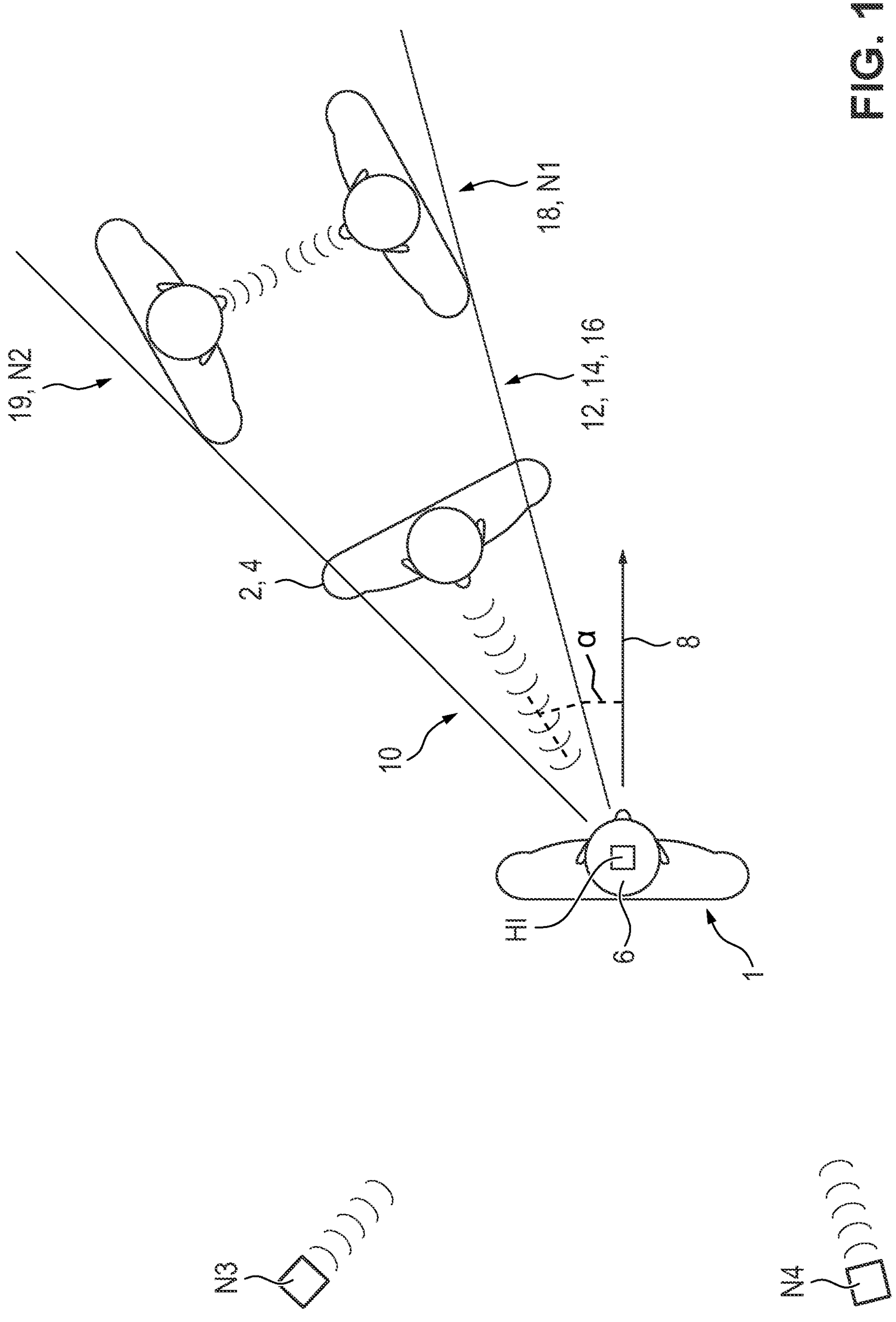
FIG. 1 shows a schematic plan view of a wearer of a hearing instrument in a conversation situation in the presence of noise signals.

Referring now to the figures of the drawing in detail and first, in particular, to FIG. 1 thereof, there is shown a wearer 1 of a hearing instrument HI in a schematic plan view. The wearer 1 in this case is in a conversation situation with an interlocutor 2, who is thus interpreted for the signal processing of the hearing instrument HI as a useful signal source 4. The wearer 1 in the present case does not have their head 6 and thus its frontal direction 8 oriented toward the interlocutor 2, but positioned slightly offset in a direction $\alpha$ relative to them (a is intended here to designate both the direction of the interlocutor 2 and the angle that this direction forms with the frontal direction 8 of the wearer 1). To improve the sound impression of the conversation situation during reproduction by the hearing instrument HI, an output signal 12 is generated by means of directional signal processing of input signals, generated in the hearing instrument HI from a sound signal 10 of the environment of the wearer 1 in each case, and is supplied to the hearing system of the wearer 1. The output signal 12 is represented in FIG. 1 by its directional characteristic 14, which schematically represents the sensitivity of the output signal 12 with respect to generic sound signals from the different directions in space.

The directional characteristic 14 has its maximum sensitivity in the direction α and around it, which is shown in FIG. 1 by means of a directional cone 16. However, within this directional cone 16, two further persons 18, 19 in their own conversation with each other are located relative to the wearer 1 slightly farther away than the interlocutor 2, who is at a distance D from the hearing instrument HI. For the wearer 1 of the hearing instrument HI, the persons 18, 19 each represent noise sources N1, N2, since they are jointly amplified with the output signal 12, unlike the noise sources N3, N4, for example, which are decreased by the output signal 12. Due to the directional amplification of the noise sources N1, N2, the SNR for the useful signal originating from the interlocutor 2 is reduced in the output signal 12.

Figure 2:
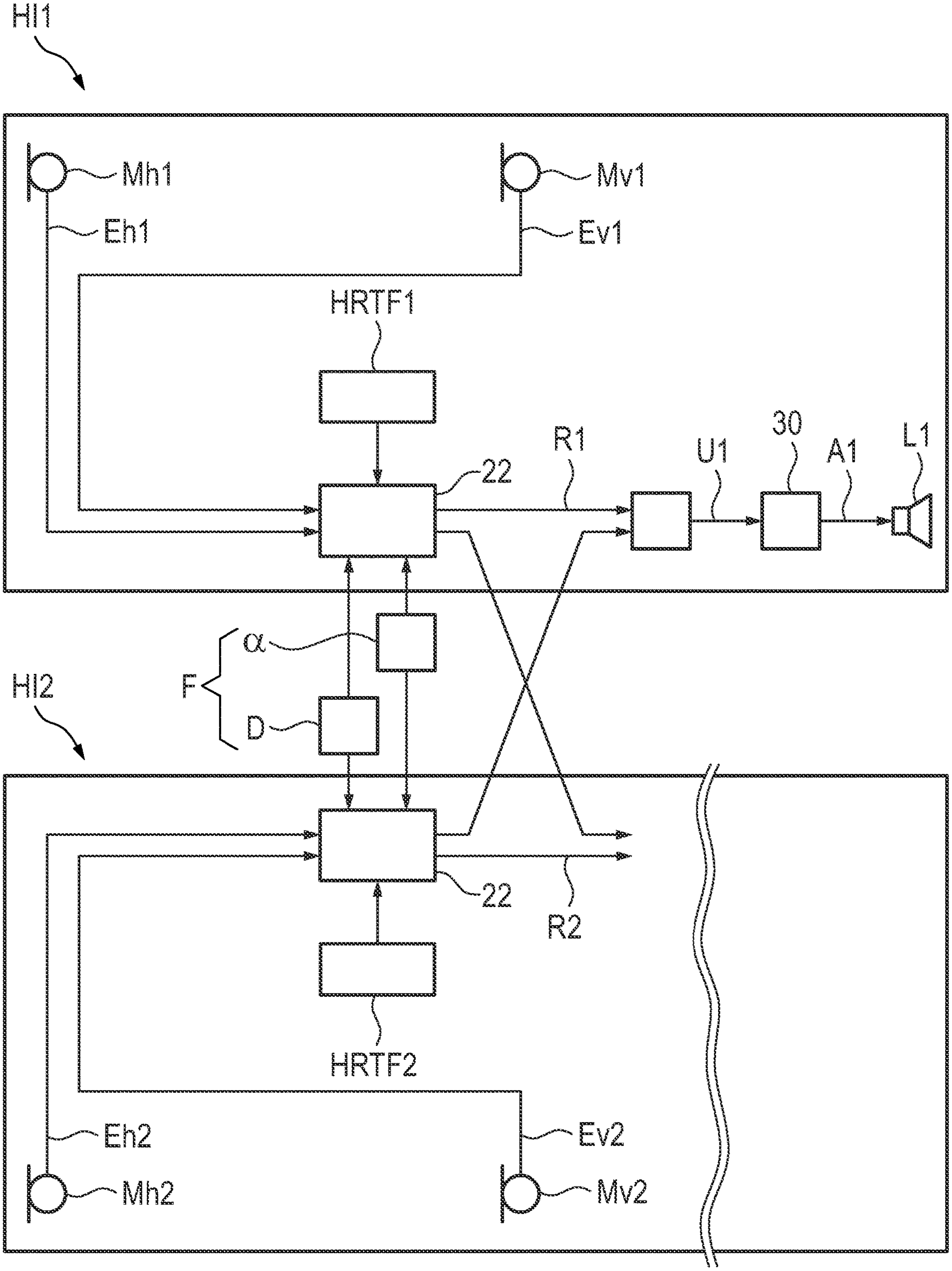
FIG. 2 shows a block circuit diagram of a binaural hearing system.

FIG. 2 shows a schematic block diagram of a binaural hearing system 20. The system 20 comprises a first hearing instrument HI1 and a second hearing instrument HI2 and is configured, in a manner to be described below, to decrease or even mask the noise sources N1, N2 in the output signal 12 according to FIG. 1 relative to the utterances of the interlocutor 2.

The first hearing instrument HI1 has a frontal first input transducer Mv1 and a rear first input transducer Mh1, which respectively generate a front first input signal Ev1 and a rear first input signal Eh1 from the sound signal 10 of the environment. The second hearing instrument HI2 has a frontal first input transducer Mv2 and a rear second input transducer Mh2, which each generate a front second input signal Ev2 and a rear second input signal Eh2 from the sound signal 10 of the environment. The said input transducers Mv1, Mh1, Mv2, Mh2 in the present case are provided by corresponding omni-directional microphones.

In the first hearing instrument HI1, a first directional signal R1 is then formed by a directional signal processor 22 based on the front and rear first input signal Ev1, Eh1 and based on a specification of a direction α and a distance D to be described below, which define a focal point F. For this purpose, a time-delayed superposition is formed from the said input signals Ev1, Eh1 in the present exemplary embodiment, and in particular a first HRTF (referred to in FIG. 2 as HRTF1) of the first hearing instrument is used. In a similar manner, a second directional signal R2 is formed in the second hearing instrument HI2 by a directional signal processor 24 based on the front and rear second input signal Ev2, Eh2, taking into account a second HRTF (HRTF2).

The second directional signal R2 is then transmitted from the second hearing instrument HI2 to the first hearing instrument HI1. For this purpose, both hearing instruments HI1 and HI2 are equipped with appropriate communication devices, such as, for example, Bluetooth and/or NFC-enabled antennas.

In the first hearing instrument HI1, a first superposition U1 is then formed from the first directional signal R1 and the second directional signal R2 (here, U1 designates both the process of the first superposition and the signal resulting from the first superposition). From the signal of the first superposition U1, a first output signal A1 is generated in the first hearing instrument, which is reproduced by a first output transducer L1 of the first hearing instrument HI1 as an output sound signal (not shown) and supplied to the hearing system of the wearer 1. The first output transducer L1 can be formed in particular as a loudspeaker. However, the first output transducer L1 can also be formed as a bone-conduction headset or similar. The signal of the first superposition U1 may be subject to further signal processing steps (such as frequency band-dependent amplification and/or compression) for generating the first output signal A1.

In a similar manner, a second superposition (not shown) is formed in the second hearing instrument HI2 from the first directional signal R1 and the second directional signal R2, from which, optionally by additional signal processing (see above), a second output signal for a second output transducer of the second hearing instrument HI2 is generated.

In a manner to be described below, by means of the binaural hearing system 20 according to FIG. 2 in the conversation situation according to FIG. 1, the useful signal source 4 (i.e., the interlocutor 2) can be selectively enhanced relative to the noise signal sources N1, N2, which are also located in the directional cone 16.

Figure 3:
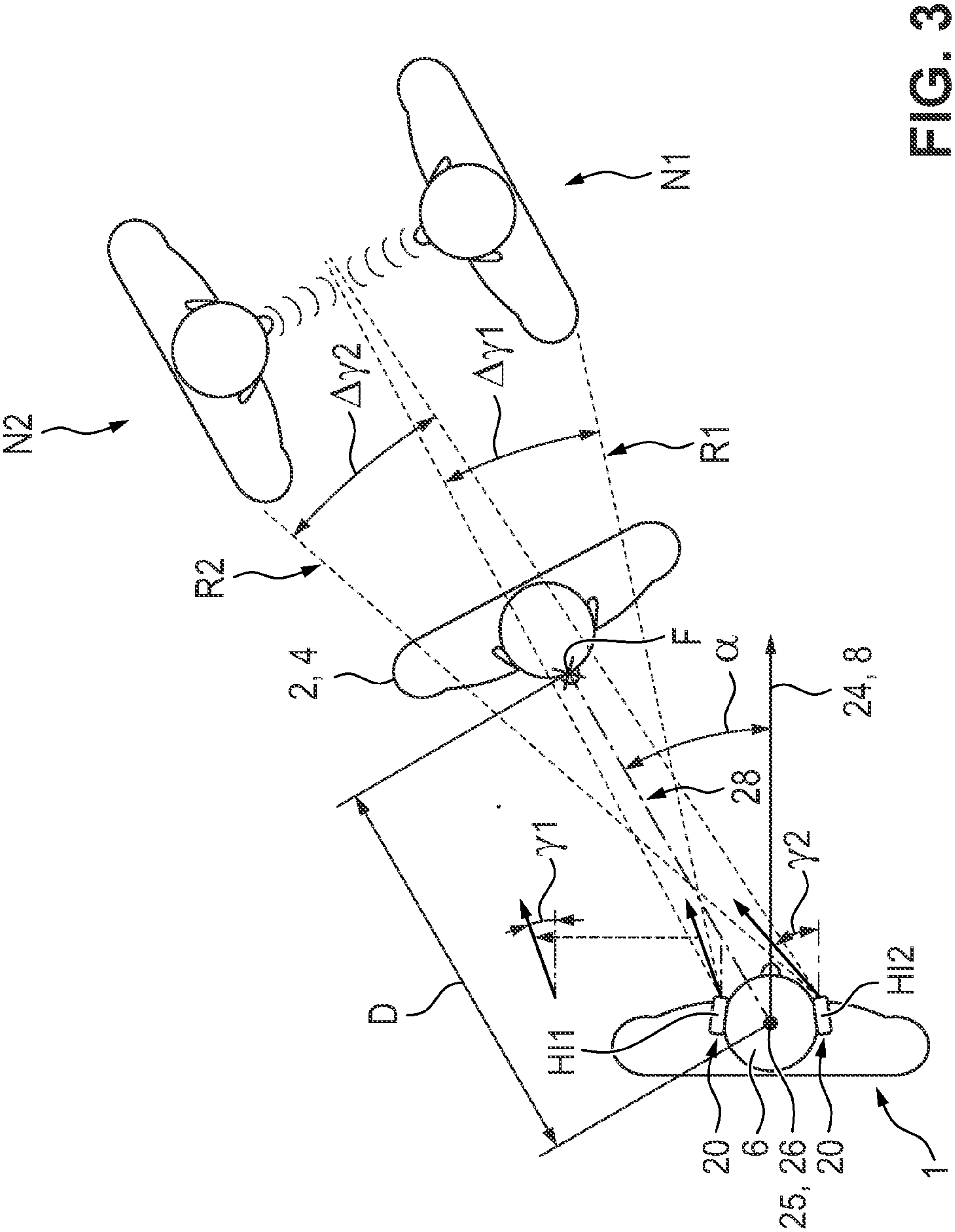
FIG. 3 shows a schematic plan view of a directional characteristic in the conversation situation of FIG. 1, which results from a directional signal processing for the binaural hearing system according to FIG. 2.

As an explanation of this, the conversation situation according to FIG. 1 is shown again in FIG. 3 in plan view. There, however, directional characteristics of the individual directional signals used for the said enhancement of the useful signal source 4, to be described in more detail, are now drawn. In the conversation situation according to FIG. 3, the wearer 1 is now wearing the binaural hearing system 20 according to FIG. 2.

For this, the frontal direction 8 forms a preferred direction 24 when the hearing system is worn as intended. Likewise, when worn as intended (in particular in the anatomically correct arrangement of the two hearing instruments HI1, HI2 on the respective ears), a reference point 26 of the binaural hearing system 20 is defined by the mid-point 25 between the two hearing instruments HI1, HI2. The reference point 26 is located in the head 6 of the wearer 1, and is used in the following geometric considerations and corresponding calculations.

For the selective enhancement of the interlocutor D, both its distance D from the reference point 26 as well as its direction α (i.e., the direction of its position with respect to the preferred direction 24) are specified in a manner not yet described in detail. This defines the focal point F as the target point for the signal processing. For the first directional signal R1, a direction of maximum sensitivity and the second directional signal R2 (represented in FIG. 3 by their dashed directional cones) are then aligned in such a way that the first superposition U1 (which is formed in the first hearing instrument HI1 from the first directional signal R1 and the second directional signal R2 transmitted by the second hearing instrument HI2) forms an overlap region 28, which comprises the focal point F and thus the interlocutor 2 (i.e., the desired useful signal source 4).

For the said alignment, a first yaw angle γ1, which indicates the direction of maximum sensitivity of the first directional signal 1, is aligned from the first hearing instrument HI1 to the focal point (see associated arrow), and a second yaw angle γ2, which indicates the direction of maximum sensitivity of the second directional signal 1, is aligned from the second hearing instrument HI2 to the focal point. This can be carried out in each case via parameters of the directional signal processors 22 of the binaural hearing system 20 according to FIG. 2 (taking into account HRTF1 and HRTF2), which generate the first and second directional signal R1, R2 from the associated input signals Ev1, Eh1 and Ev2, Eh2 respectively. Furthermore, a first angular width $\Delta\gamma 1$ (i.e., angular aperture, spread) of the first directional signal R1 (which in particular can be defined on the basis of a limit value for the relative sensitivity with respect to the maximum sensitivity, which is not undershot within the first angular width $\Delta\gamma 1$) and a corresponding second angular width $\Delta\gamma 2$ of the second directional signal R2 are adjusted in order to adjust the overlap region 28 such that the real useful signal source 4, which is assumed to be at the (idealized) focal point F, is located at that point with a sufficiently high degree of reliability. In particular, in the process a minimum radial distance Dmin of the overlap region 28 is also adjusted by way of the first and second angular width $\Delta\gamma 1$, $\Delta\gamma 2$ (and thus also by way of the respective directional signal processing 22 to generate the first and second directional signal R1, R2).

Figure 4:
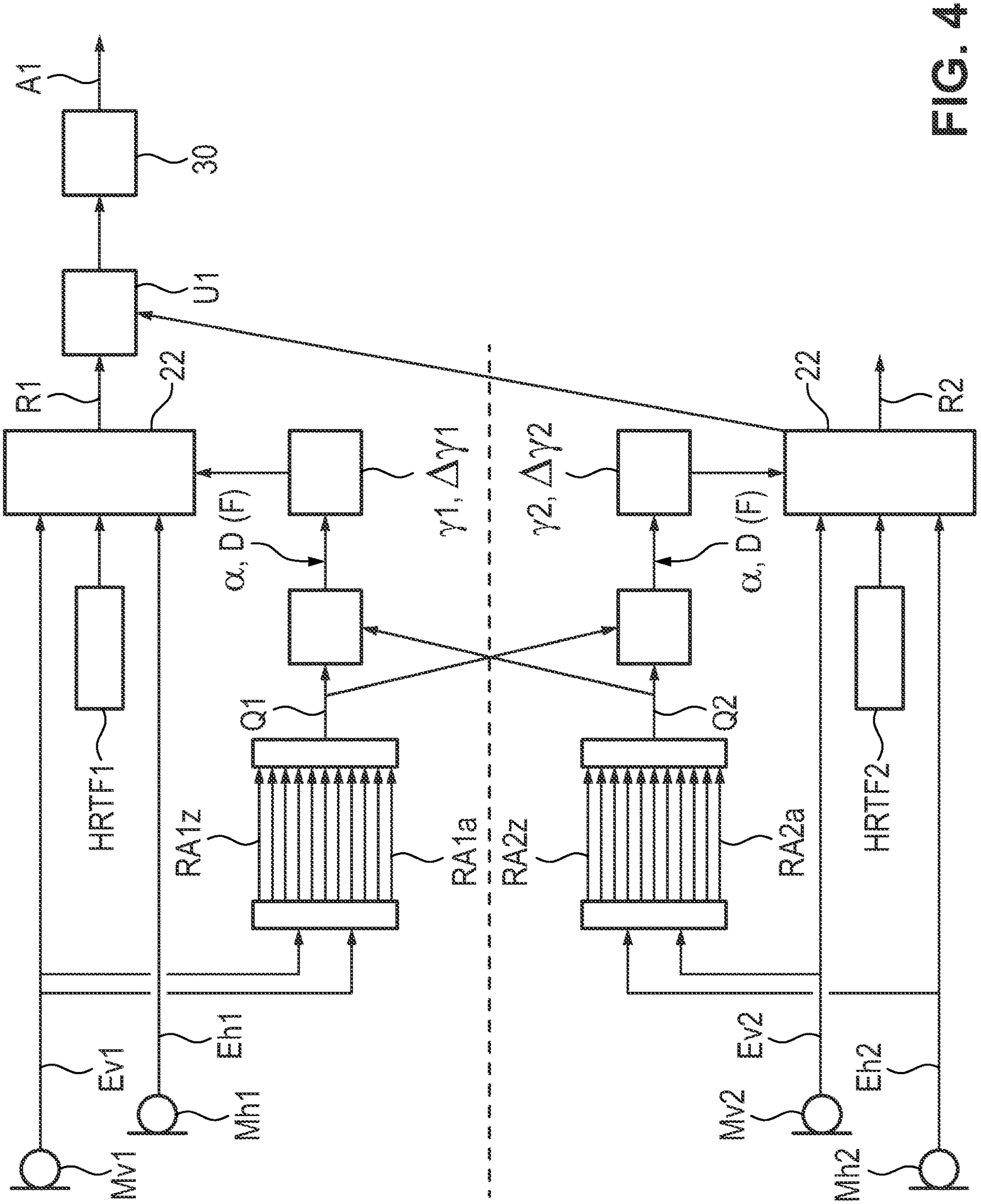
FIG. 4 is a flowchart of a method for the directional signal processing of the resulting signal according to FIG. 3.

In FIG. 4, the sequence of a method is now illustrated schematically in a flow diagram, by means of which the signal processing described with reference to FIG. 3 is implemented for the alignment of the first superposition U1 onto the focal point F.

As already described with reference to FIGS. 2 and 3, the distance D of the useful signal source 4 to the reference point 26 of the binaural hearing system and the direction $\alpha$ of the useful signal source 4 with respect to the preferred direction 24 are predetermined for the method, whereby the focal point F is defined (in fact, in polar coordinates with reference point 26 as the origin). The specification in this case is based on the input signals Ev1, Eh1, Ev2, Eh2 in a manner to be described below. Based on the focal point F, the first and second directional signals R1, R2 are generated in the first and second hearing instrument HI1, HI2 from the frontal and rear first and second input signals Ev1, Eh1 and Ev2, Eh2 respectively. In this case, the first and second yaw angle $\gamma 1$, $\gamma 2$ and, optionally, the first and second angular width $\Delta\gamma 1$, $\Delta\gamma 2$ for the respective directional signal R1, R2 are adjusted via parameters of the respective directional signal processing 22 and taking into account the respective HRTF. The two directional signals R1, R2 are each transmitted to the other hearing instrument HI1, HI2. In the first hearing instrument HI1, the first superposition U1 is formed from the two directional signals R1, R2, which are now locally present.

This can be achieved in particular by forming a simple sum of the form $$U1(f,k)=R1(f,k)+R2(f,k)$$

where k is a discrete time index, and f is a frequency band index. The first output signal A1 is then generated from the first superposition U1, optionally in further signal processing steps, not shown in detail, such as by frequency band-dependent amplification and/or compression, etc. The first output signal A1 is converted by the first output transducer L1 into a corresponding output sound signal (not shown). In the second hearing instrument HI2, a second output signal is similarly generated, not shown in detail, for reproduction by a second output transducer.

For the specification of the distance D and the direction $\alpha$, based on the frontal and rear first and second input signals Ev1, Eh1, Ev2, Eh2 (and, optionally, taking into account HRTF1 and HRTF2 respectively; not shown), a plurality of analysis directional signals RA1*a-z*, RA2*a-z* is formed in the first hearing instrument HI1 and in the second hearing instrument HI2, each having their minimum sensitivity in different angular directions ("minimum directions"). These analysis directional signals RA1*a-z*, RA2*a-z* "scan", in each case via the variation of their minimum directions, the space surrounding the associated hearing instrument HI1, HI2 for sound sources, wherein a sound source present in a minimum direction of a particular analysis directional signal is attenuated by the same.

To identify a sound source, the analysis directional signals RA1*a-z*, RA2*a-z* are compared locally with the front first and second input signal Ev1, Ev2 respectively of the relevant hearing instrument HI1, HI2 as a respective reference signal (alternatively, the rear first or second input signal Eh1, Eh2 can also be used in each case as such a local reference signal). On the basis of the differences in the respective signal power, the presence of a sound source in the minimum direction of the relevant analysis directional signal can then be inferred. In particular, for detecting whether a sound source is a useful signal source, it can be assumed in this case that such a useful signal source is given by a speaker, and then speech recognition (not shown in FIG. 4) can be applied to the analysis directional signals RA1*a-z*, RA2*a-z* and the respective local reference signals (i.e., in the present case, the front first or second input signal EV1, Ev2) in each case, in order to determine the speech components of the signal powers of the relevant signals as well as the attenuation of such a speech component by a relevant analysis directional signal. At a maximum attenuation, an analysis directional signal RA1*a-z*, RA2*a-z* can then define the associated minimum direction as the respective first or second source direction Q1, Q2 of the useful signal source with respect to the relevant hearing instrument HI1, HI2. A direction $\alpha$ and a distance D of the useful signal source with respect to the binaural hearing system 20 (and its preferred direction 24) can then be determined from a) the two source directions Q1, Q2 identified in the individual hearing instruments HI1, HI2 respectively for the useful signal source and b) the distance between the hearing instruments HI1, HI2, for which the first or second source direction Q1, Q2 identified is transmitted to the respective other hearing instrument HI2, HI1, and the same steps for determining the direction $\alpha$ and distance D are carried out in both hearing instruments HI1, HI2.

Although the invention has been illustrated and described in greater detail by means of the preferred exemplary embodiment, the invention is not restricted by the examples disclosed and other variations can be derived therefrom by the person skilled in the art without departing from the scope of protection of the invention.

The following is a summary list of reference numerals and the corresponding structure used in the above description of the invention:

1 wearer
2 interlocutor
4 useful signal source
6 head
8 frontal direction
10 sound signal
12 output signal
14 directional characteristic
16 directional cone
18 person
19 person
20 binaural hearing system
22 directional signal processing
24 preferred direction
25 mid-point

26 reference point
28 overlap region
30 additional signal processing steps
A1 first output signal
D distance
Ev1/2 frontal first/second input signal
Eh1/2 rear first/second input signal
F focal point
HI1/2 first/second hearing instrument
HI hearing instrument
HRTF1/2 first/second HRTF
L1 first output transducer
Mv/h1/2 front/rear first/second input transducer
N1-4 noise source
Q1/2 first/second source direction
R1/2 first/second directional signal
RA1/2*a-z* first/second analysis directional signals
U1 first superposition
α direction
γ1/2 first/second yaw angle
Δγ1/2 first/second angular spread, width

The invention claimed is:

1. A method for directional signal processing for a binaural hearing system having a first hearing instrument and a second hearing instrument, the method comprising:

generating by a plurality of input transducers of the first hearing instrument a plurality of first input signals from a sound signal of the environment;

generating by a plurality of second input transducers of the second hearing instrument a plurality of second input signals from the sound signal of the environment;

determining a direction with respect to a preferred direction of the binaural hearing system and a distance from a reference point of the binaural hearing system, and thereby determining a focal point;

generating a first directional signal from the first input signals by directional signal processing, such that a direction of maximum sensitivity, starting from the first hearing instrument, forms a first yaw angle with the preferred direction;

generating a second directional signal from the second input signals by directional signal processing, such that a direction of maximum sensitivity, starting from the second hearing instrument, forms a second yaw angle with the preferred direction;

adjusting the first yaw angle and the second yaw angle via the directional signal processing of the first and second input signals such that a superposition of the first directional signal with the second directional signal has a maximum sensitivity in an overlap region that includes the predetermined focal point; and generating an output signal of the binaural hearing system on a basis of the superposition of the first and second directional signals.

2. The method according to claim 1, which comprises one or both of the following steps:

determining the reference point of the binaural hearing system on a basis of a mid-point between the first hearing instrument and the second hearing instrument when the first and second hearing instruments are worn as intended; or determining the preferred direction of the binaural hearing system is determined on the basis of a frontal direction of a wearer when the hearing instruments of the hearing system are worn as intended.

3. The method according to claim 1, wherein the adjusting step comprises adjusting the first yaw angle and the second yaw angle on a basis of the distance and the direction and on a basis of a distance between the first hearing instrument and the second hearing instrument, such that an intersection point of the associated angular lines of first and second yaw angles does not exceed a predetermined maximum distance from the focal point.

4. The method according to claim 1, which comprises one or both of the following steps:

generating the first directional signal from the first input signals such that the first directional signal has a first angular width about the first yaw angle, within which a sensitivity does not fall below a predetermined minimum value; or generating the second directional signal from the second input signals such that the second directional signal has a second angular width about the second yaw angle, within which the sensitivity does not fall below a predetermined minimum value.

5. The method according to claim 4, which comprises defining at least one of the first angular width or the second angular width on at least one of a basis of a smallest distance of the overlap region from the reference point or on a basis of a greatest distance of a spatial point of the overlap region from the reference point.

6. The method according to claim 1, which comprises one or more of the following steps:

generating the first directional signal on a basis of a time-delayed superposition of the first input signals, and adjusting the first yaw angle using at least one time constant and/or at least one weighting factor of the time-delayed superposition; or generating the second directional signal on a basis of a time-delayed superposition of the second input signals, and adjusting the second yaw angle using at least one time constant and/or at least one weighting factor of the time-delayed superposition.

7. The method according to claim 6, which comprises one or more of the following steps:

generating, as a plurality of first input signals, a front first input signal and a rear first input signal by a corresponding frontal or rear first input transducer respectively; or generating, as a plurality of second input signals, a frontal second input signal and a rear second input signal by a corresponding frontal or rear second input transducer respectively.

8. The method according to claim 1, which comprises using a head-related transfer function for the first hearing instrument or for the second hearing instrument for respectively adjusting the first yaw angle and/or the second yaw angle.

9. The method according to claim 1, which comprises:

specifying the direction with respect to the preferred direction of the binaural hearing system as a direction of a sound source in the environment with respect to the preferred direction; and defining the distance from the reference point of the binaural hearing system as the distance of the sound source from the reference point.

10. The method according to claim 9, which comprises analyzing at least some of the first input signals or second input signals, and based on the analysis, determining the direction of the sound source in the environment with respect to the preferred direction and/or the distance of the sound source from the reference point.

11. The method according to claim 10, which comprises:

determining a change of at least one of the direction or the distance of the sound source on a basis of the analysis of at least some of the first input signals or second input signals;

updating a specification of the focal point accordingly; and readjusting the first yaw angle and the second yaw angle accordingly.

12. The method according to claim 10, which comprises:

generating a plurality of first analysis directional signals based on the first input signals by way of directional signal processing, such that each of the first analysis directional signals has a minimum sensitivity in a different minimum direction with respect to the preferred direction in each case, and determining, on a basis of the first analysis directional signals, a first source direction of the sound source with respect to the preferred direction, starting from the first hearing instrument;

generating a plurality of second analysis directional signals based on the second input signals by way of directional signal processing, such that each of the second analysis directional signals has a minimum sensitivity in a different minimum direction with respect to the preferred direction in each case, and determining, on a basis of the second analysis directional signals, a second source direction of the sound source with respect to the said preferred direction, starting from the second hearing instrument; and determining, on a basis of the first source direction, the second source direction, and a distance between the first and second hearing instruments, the distance of the said sound source with respect to the reference point of the binaural hearing system and the direction of the sound source with respect to the preferred direction.

13. A binaural hearing system, comprising a first hearing instrument and a second hearing instrument, wherein the binaural hearing system is configured to carry out the method according to claim 1.

* * * * *